US009272348B2

(12) United States Patent
Griffard et al.

(10) Patent No.: US 9,272,348 B2
(45) Date of Patent: Mar. 1, 2016

(54) BOLT HOLE WITH IMPROVED THREADS AND TAP FOR MANUFACTURE THEREOF

(71) Applicants: Kenneth P. Griffard, Three Rivers, MI (US); Carl P. McLean, Conneaut Lake, PA (US); Michael Rhoades, Guys Mills, PA (US)

(72) Inventors: Kenneth P. Griffard, Three Rivers, MI (US); Carl P. McLean, Conneaut Lake, PA (US); Michael Rhoades, Guys Mills, PA (US)

(73) Assignee: Meadville Forging Co LP, Meadville, PA (US)

( * ) Notice: Subject to any disclaimer, the term of this patent is extended or adjusted under 35 U.S.C. 154(b) by 243 days.

(21) Appl. No.: 13/929,241

(22) Filed: Jun. 27, 2013

(65) Prior Publication Data
US 2015/0003936 A1    Jan. 1, 2015

(51) Int. Cl.
*B23G 5/06* (2006.01)
*F16B 37/00* (2006.01)
*B23G 7/02* (2006.01)

(52) U.S. Cl.
CPC .. *B23G 5/06* (2013.01); *B23G 7/02* (2013.01); *F16B 37/00* (2013.01); *B23G 2200/44* (2013.01); *Y10T 408/03* (2015.01); *Y10T 408/907* (2015.01)

(58) Field of Classification Search
CPC ...... B23G 5/06; B23G 7/02; B23G 2200/142; B23G 2200/36; B23G 2200/44; B23G 2210/16; B23G 7/00

USPC .............. 72/70, 118; 470/199, 204
See application file for complete search history.

(56) References Cited

U.S. PATENT DOCUMENTS

| | | | | |
|---|---|---|---|---|
| 3,171,146 | A | * | 3/1965 | Moss et al. ............... 470/204 |
| 3,258,797 | A | * | 7/1966 | Budd ....................... 470/204 |
| 3,651,678 | A | * | 3/1972 | Zook et al. ................. 72/103 |
| 4,491,002 | A | * | 1/1985 | Toropov et al. ............. 72/118 |
| 4,539,832 | A | * | 9/1985 | Koller ...................... 72/118 |
| 7,357,606 | B1 | * | 4/2008 | Pettit et al. ................ 408/222 |

FOREIGN PATENT DOCUMENTS

| | | | | |
|---|---|---|---|---|
| DE | 10002756 | A1 * | 7/2001 | ........... B23G 7/02 |
| DE | 10305198 | A1 * | 8/2004 | ........... B23G 5/06 |
| SU | 856701 | A1 * | 8/1981 | ...... B23G 2200/44 |

* cited by examiner

*Primary Examiner* — Edward Tolan
(74) *Attorney, Agent, or Firm* — Schiff Hardin LLP

(57) ABSTRACT

In a part having a surface, a bolt hole is provided extending into the part from the surface. Threads in the hole have crests with a fishmouth shape at the crests defined by a central concave portion and raised corner portions at ends of the concave portion. At least one start thread preceding the threads with the fishmouth shape crests is provided having a substantially flat crest without the fishmouth shape. A tap for manufacturing the threaded bolt hole has a first thread section and a second thread section. The second thread section has a plurality of threads for creating at least one improved start thread in the hole to be threaded, minor diameters at valleys between the threads of the second thread section being greater than minor diameters at valleys between threads of the first thread section or major diameters at crests of the threads of the second thread section being greater than major diameters at crests of the first thread section.

4 Claims, 4 Drawing Sheets

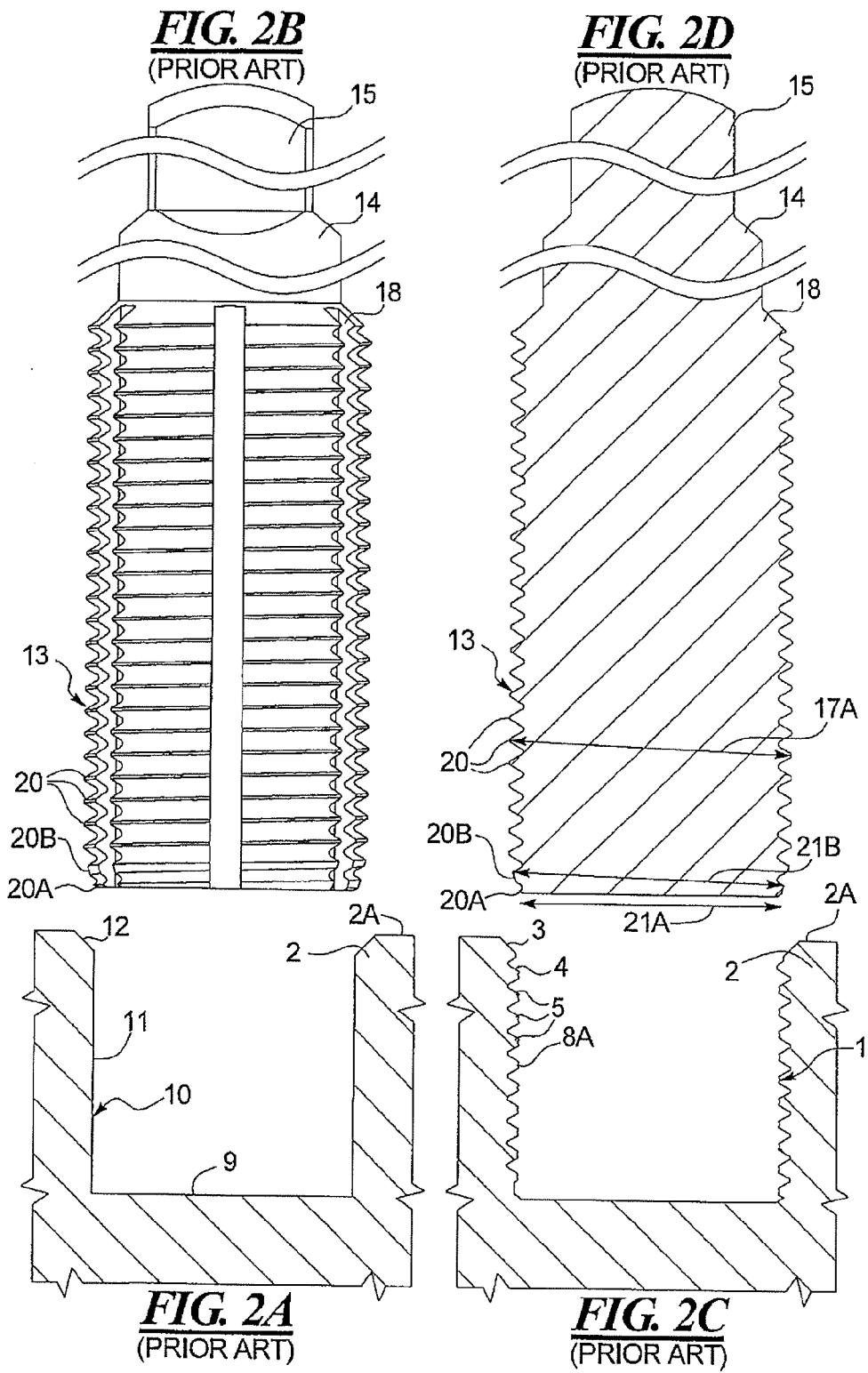

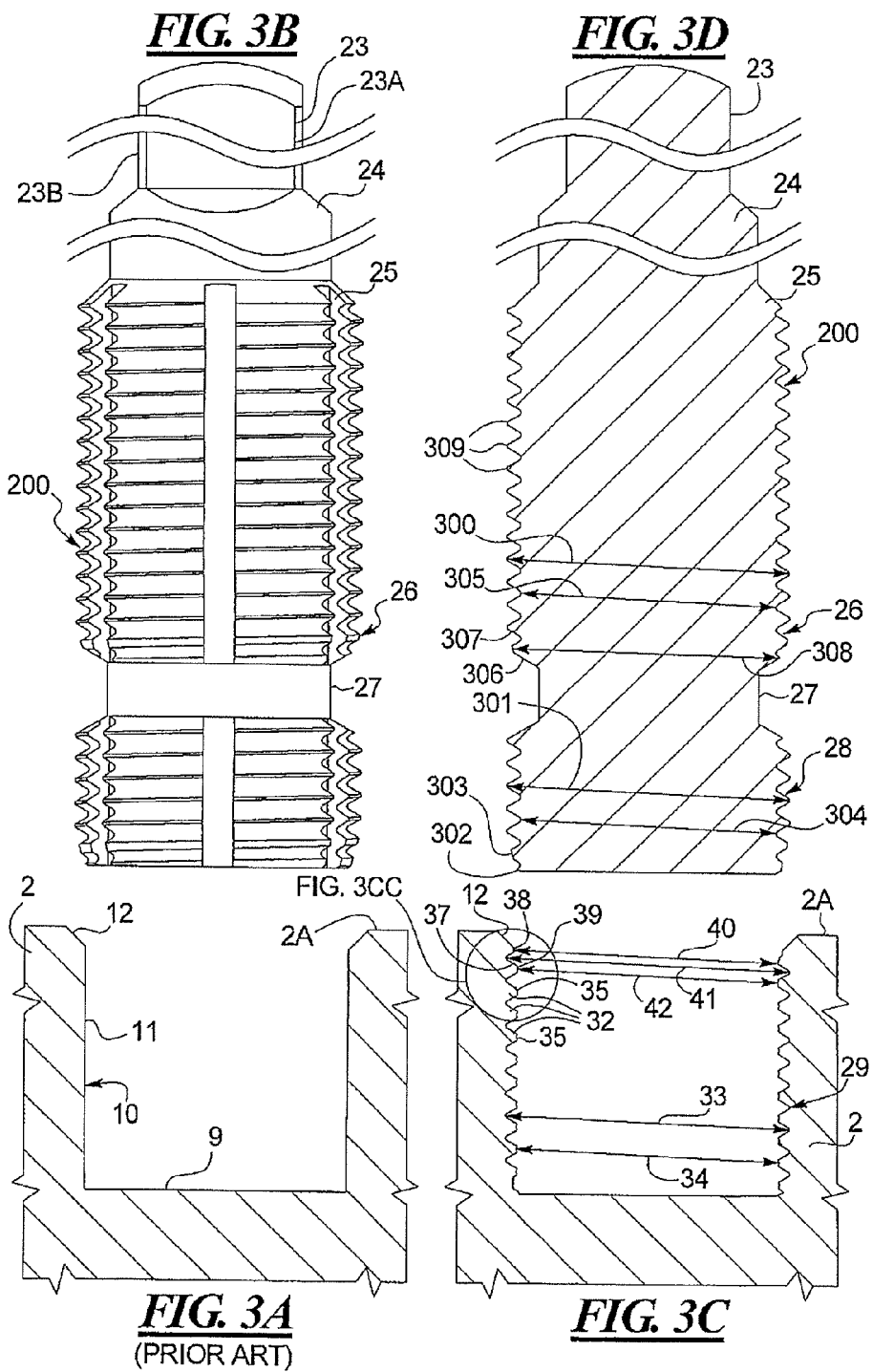

BOLT HOLE WITH IMPROVED THREADS AND TAP FOR MANUFACTURE THEREOF

BACKGROUND

An example of a known bolt hole with threads is generally shown at 1 in a vertical slice view in prior art FIG. 1A. The bolt hole 1 is formed in a part 2 and extends inwardly from a chamfer 12 in a surface 2A of part 2. A bolt 100 shown in vertical cross-section is illustrated in prior art FIG. 1B. The bolt is for threading into the bolt hole 1. Chamfers, however, although preferred, are not required.

When the term "bolt" is used herein it should be understood that a screw is also included in the definition of the word "bolt".

The term "tap" is used in connection with roll forming threads.

The term "root" of a thread in a hole means valley between adjacent threads and is the major diameter between thread valleys on opposing sides of the hole.

The term "crest" of a thread in a hole means the peak of the thread and is the minor diameter between thread peaks on opposing sides of the hole.

The term "root" of a thread at a periphery of a tap means the valley between adjacent threads and is the minor diameter between thread roots on opposing sides of the tap.

The term "crest" of a thread at a periphery of a tap means the peak of the thread and is the major diameter between thread peaks on opposing sides of the tap.

The bolt hole 1 has a first start thread 3 located at the chamfer 12, a second start thread 4, and a plurality of following threads 5. An inner or minor diameter 6 of the threads 4 and 5 between crests of the threads is constant while the minor diameter of the first thread 3 is slightly greater due to the chamfer thereat. An outer or major diameter 7 of the threads 3, 4, and 5 is the same. The first start thread 3 followed by the second start thread 4 engage with a corresponding first start thread 101 followed by a second start thread 102 on a leading end of the bolt 100 shown in FIG. 1B. The bolt 100 also has further threads 103. An inner or minor diameter 104 of the threads 101, 102, and 103 is constant as is an outer or major diameter 105 of threads 101, 102, and 103. The minor diameter of the bolt threads or the bolt hole threads is also known as a root diameter.

So-called "fishmouth" curved concave flats 8A defined by an inwardly curved concave profile are formed at the thread crests or minor diameters 6. These curved concave flats 8A shown enlarged in FIG. 1AA for the two start threads 3 and 4 and next thread 5 enclosed by the circle FIG. 1AA in FIG. 1A are present in all of the threads 3, 4, and 5 of the hole 1. When one attempts to thread the bolt 100 into the bolt hole 1, and particularly if done automatically, frequently the first and possibly the second start threads 101 and 102 on the bolt 100 will not properly engage with the first and possibly the second start threads 3 and 4 in the bolt hole 1 in view of the presence of the fishmouth 8A shaped as a concave minor diameter on the first and second start threads 3 and 4.

Explaining in more detail, as shown in the prior art hole 1 of FIG. 1A, the first thread 3, the second thread 4, and the following normal threads 5 each have the fishmouth or curved concave flat 8A at the crest of the respective threads. This fishmouth at the crest is shown enlarged in FIG. 1AA which is illustrating the start threads at circle FIG. 1AA of FIG. 1A. The fishmouth 8A at the crest has first and second raised corner portions 8AA and 8AB. Between these raised corner portions is a central depression 8AC. This concave depression 8AC is formed during tapping when material movement at thread side-walls 22A and 22B is pushed towards the crest 8A and causes the corner portions 8AA and 8AB to be raised, resulting in the depression 8AC between the corner portions. This fishmouth on the first two start threads 3 and 4 of the threaded prior art bolt hole 1 frequently inhibits proper engagement of the start threads 101 and 102 on the prior art bolt 100, particularly during automated assembly.

Manufacture of the prior art bolt hole 1 is explained with reference to prior art FIGS. 2A and 2B. In FIG. 2A a start hole 10 shown in a vertical slice has a cylindrical straight wall 11 terminating at a floor 9, which may be either straight or concave. Start hole 10 is drilled into the part 2 from the part surface 2A. The chamfer 12, which is a partial conical section, is provided at an entrance to the start hole 10 in known fashion. As indicated previously, however, although desirable, a chamfer is not required.

As shown in prior art FIG. 2B in a side view, a tap is generally shown at 13 which is used to create the threads 3, 4, 5 of FIG. 1A in start hole 10. Such a prior art tap 13 is defined by a cylindrical shank 14 having at one end a square cross-section tap drive section 15 which merges into the shank 14 and is drivable when received in a drive bit of a drive unit. The shank 14 has a thread section 13 which creates the desired threads 3, 4, 5 shown in prior art FIGS. 1A and 2C. FIGS. 1A and 2C show the same identical prior art hole 1.

Prior art FIG. 2D shows a vertical cross-section at a middle of the prior art tap 13 shown in prior art FIG. 2B. The thread section 13 is formed on enlarged diameter portion 18 of shank 14. The shank 14 merges into the tap drive section 15. The thread section 13 has a plurality of normal threads 20 and first and second start threads 20A and 20B having respective outer or major diameters 21A and 21B which are slightly smaller than an outer or major diameter 17A of normal threads 20 in thread section 13.

SUMMARY

It is an object to improve engagement of bolts in a threaded bolt hole.

In a part having a surface, a bolt hole is provided extending into the part from the surface. Threads in the hole have crests with a fishmouth shape at the crests defined by a central concave portion and raised corner portions at ends of the concave portion. At least one start thread preceding the threads with the fishmouth shape crests is provided having a substantially flat crest without the fishmouth shape. A tap for manufacturing the threaded bolt hole has a first thread section and a second thread section. The second thread section has a plurality of threads for creating at least one improved start thread in the hole to be threaded, minor diameters at valleys between the threads of the second thread section being greater than minor diameters at valleys between threads of the first thread section or major diameters at crests of the threads of the second thread section being greater than major diameters at crests of the first thread section.

BRIEF DESCRIPTION OF THE DRAWINGS

FIG. 1AA is an enlargement of region FIG. 1AA indicated by a circle in FIG. 1A;

FIG. 2A is a side view of a slice taken vertically and down through a center of a prior art start hole to be threaded to create the prior art start hole shown in FIG. 1A;

FIG. 2B is a side view of a prior art tap used to thread the start hole shown in FIG. 2A;

FIG. 2C is the same prior art threaded bolt hole shown in FIG. 1A;

FIG. 2D is a cross sectional view taken along a vertical central plane of the prior art tap of FIG. 2B;

FIG. 3A shows the same prior art start hole as FIG. 2A;

FIG. 3B is a side view of an exemplary embodiment of an improved tap for providing threads in the prior art start hole of FIG. 3A;

FIG. 3CC is an enlargement of improved start threads in the improved threaded hole of FIG. 3C at the region FIG. 3CC indicated by a circle in FIG. 3C;

FIG. 3D is a vertical cross-section of the improved tap of FIG. 3B;

DESCRIPTION OF PREFERRED EXEMPLARY EMBODIMENTS

Figure 1B:
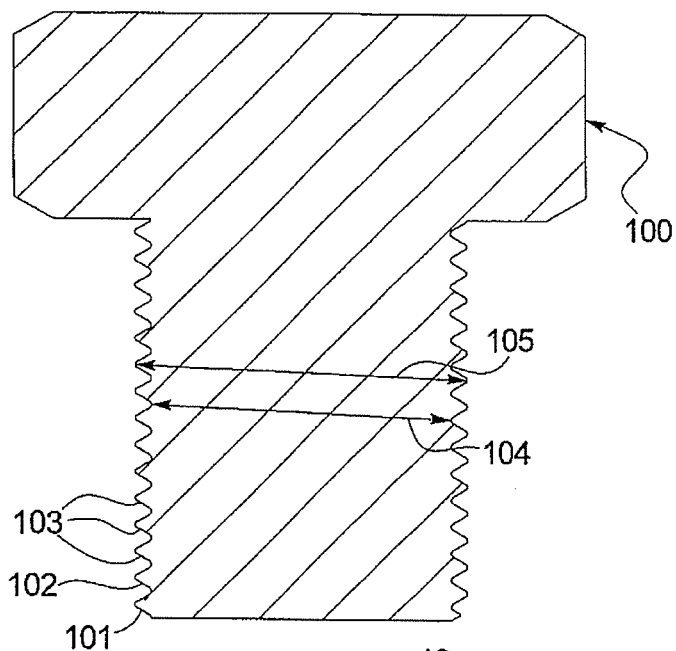
FIG. 1B is a side view of a vertical cross-section through a center of a prior art bolt.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated exemplary embodiments and such further applications of the principles of the invention as illustrated as would normally occur to one skilled in the art to which the invention relates are included herein.

FIG. 3A shows the same prior art start hole 10 of FIG. 2A having a sidewall 11 and chamfer 12 in surface 2A of part 2. The chamfer is desirable but is not necessarily required, however. This start hole 10 is to be threaded by an improved tap 200 shown in FIGS. 3B and 3D.

Figure 3C:
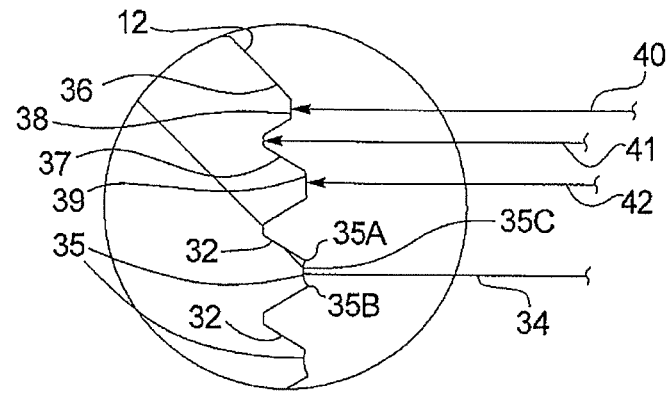
FIG. 3C is a vertical slice view taken along a vertical plane through a middle of an improved threaded bolt hole which has improved threads by use of the improved tap shown in FIG. 3B.

FIG. 3B shows the improved tap 200 for creating improved first and second start threads 36 and 37 shown in FIGS. 3C and 3CC in the start hole 10. The improved tap 200 has at an upper end a square cross-section tap drive section 23 for engagement with a drive bit and which is followed by a cylindrical shank section 24 whose diameter is greater than a width between sidewalls 23A, B of the rectangular drive section 23. At an enlarged diameter portion 25 of the shank section 24, a crest altering thread section 26 for the first and second start threads 36 and 37 of the improved threaded hole are provided. Thereafter a cylindrical relief section 27 of smaller diameter than a minor diameter 305 of the threads of the thread section 26 is provided. Although preferred, the relief section is not required. Thereafter a normal thread section 28 having a major diameter 301 like the major diameter 17A of prior art thread section 13 shown in FIGS. 2B and 2D is provided. The relief section diameter is equal to but preferably less than the minor diameter 304 of normal thread section 28.

The crest altering thread section 26 to reduce or eliminate the fishmouth and to create the improved first and second start threads 36 and 37 discussed hereafter will now be explained. The major diameter 300 at the crests of the threads in section 26 is the same as the major diameter 301 at the crests in the normal thread section 28 having normal prior art threads. However, minor diameter 305 in the valleys or roots between threads 309 in section 26 is greater than the minor diameter 304 in the valleys or roots between the threads in the normal section 28. Furthermore the major diameter 308 of the first lead thread 306 is slightly less than the major diameter 300 of the second lead thread 307 which is the same as the major diameter 300 of the other remaining threads 309.

Although the above is preferred, alternatively the major diameter of the threads at their crests in section 26 is greater than the major diameter 301 at the crests in the normal thread section 28, and the minor diameter in the valley or roots between the threads is the same as the minor diameter 304 in valleys or roots between the threads in the normal section 28. In this case the minor diameter of the first lead thread is slightly greater than the minor diameter 300 of the second lead thread which is the same as the minor diameter of the other remaining threads.

Figure 1A:
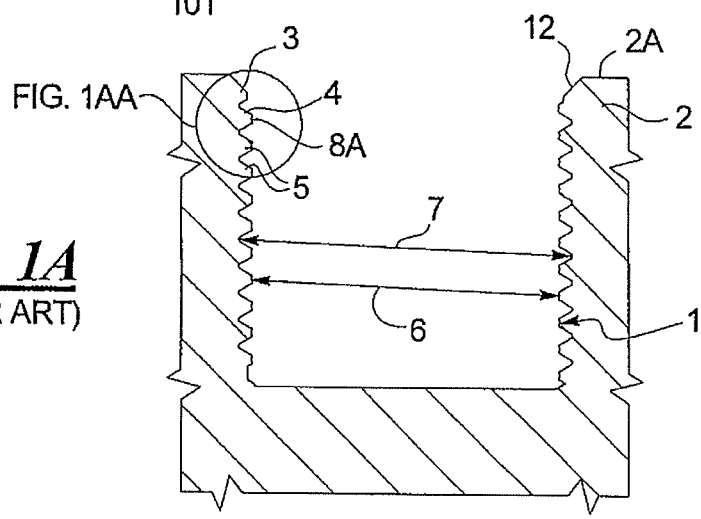
FIG. 1A is a side view of a vertical slice through a prior art threaded bolt hole.
Figure 1A:
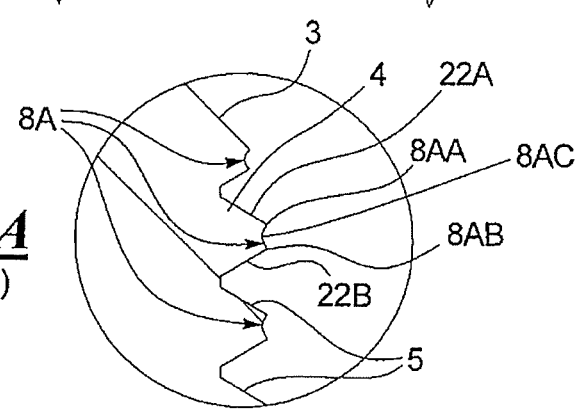

As shown in the vertical slice view of FIG. 3C, an improved threaded bolt hole 29 is provided in surface 2A of part 2 by using the improved tap 200 to thread the start hole 10 in FIG. 3A. Normal prior art threads 32 having a major diameter 33 and a minor diameter 34 just like the major and minor diameters 7 and 6 in FIG. 1A are provided. At each crest of the normal prior art threads 32, the fishmouth 35, like the prior art fishmouth 8A as shown in FIG. 1AA, is formed. As in the prior art, this fishmouth 35 shown in enlarged view in FIG. 3CC for the third thread 32 after the first and second start threads has first and second raised corner portions 35A and 35B with an inwardly or concave central depression 35C. The first start thread 36 has associated with it a flattened crest fishmouth 38 and the second thread 37 has a flattened and widened crest fishmouth 39. For the first start thread 36 a minor diameter 40 at crest fishmouth 38 is greater than the minor diameter 34 at the crest fishmouth 35 of the normal prior art threads 32, particularly where it merges with the chamfer surface 12. The second start thread 37 at crest fishmouth 39 has a greater minor diameter 42 than the minor diameter 34 at the crest fishmouth 35 of the normal prior art threads 32, but less than the minor diameter 40 at the crest fishmouth 38 of first start thread 36. Thus the fishmouth depression has been substantially eliminated at crest fishmouths 38 and 39 of first and second start threads 36 and 37. The increased minor diameter and flat surfaces without raised corner portions at crest fishmouths 38 and 39 create the flattened crest fishmouths at 38 and 39. Thus the fishmouth on these two start threads has been substantially reduced or eliminated.

The major diameter 41 at the valley between threads 36 and 37 is the same as major diameter 33 at the valleys between threads 32.

With the normal prior art threads 32 material is pushed along the sides of the threads towards the crest fishmouth 35 resulting in the raised corner portions 35A and 35B at ends of the curved or concave portion 35C since the material has been pushed to raise these corner portions to thus form the curved depression therebetween. However for the improved crest fishmouths 38 and 39 which are flattened, the corner portions are substantially in-line with the central portion, resulting in this substantially flat crest. This occurs since material has been pushed at these first and second start threads toward the crest along the thread sidewall and fills in the depression to prevent the fishmouth of the normal prior art crest.

Figure 4B:
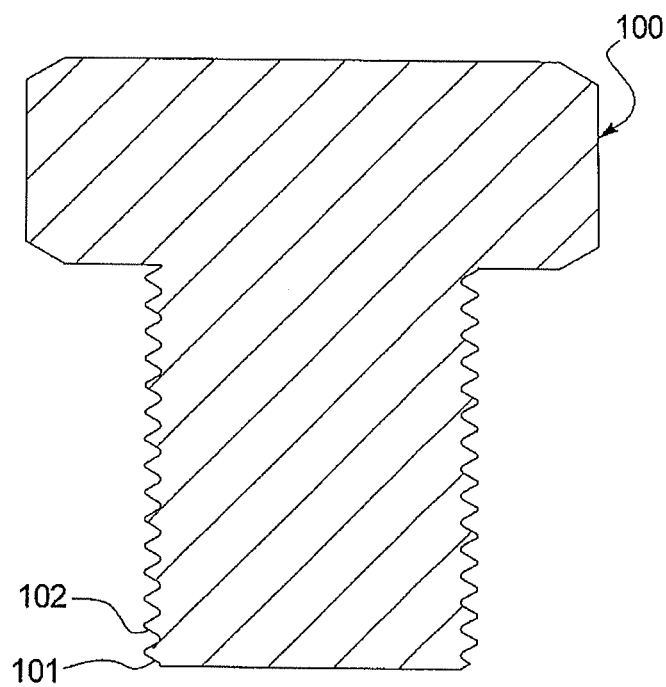
FIG. 4B is a side cross-sectional view of the same prior art bolt shown in FIG. 1B.
Figure 4A:
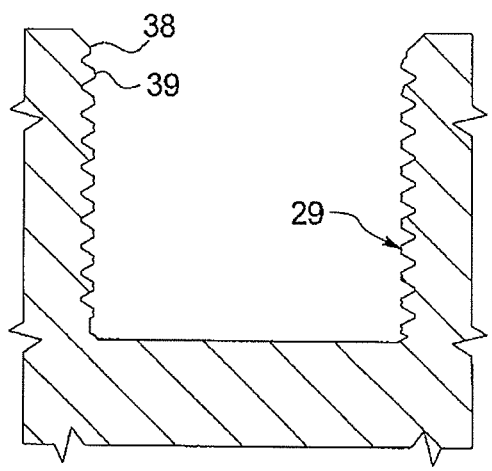
FIG. 4A is the same slice view of the improved threaded bolt hole shown in FIG. 3C.

The improved crest fishmouths 38 and 39, as shown in FIG. 4A, result in an improvement in threading of the prior art bolt 100 shown in FIG. 4B into the improved threaded hole 29 and improves engagement particularly in an automated environment for placing bolts into the improved bolt holes 29. Faulty engagement is thus substantially reduced. Thus the lead threads 101 and 102 of the prior art bolt are not mis-threaded at the lead or start threads 38 and 39 of the improved hole 29 shown in FIG. 4A.

In utilizing the improved tap to create the improved bolt holes, initially the unthreaded hole 10 is provided in the part 2 and the chamfer is provided. Thereafter the improved tap is rotated such that the normal thread section 28 creates the normal threads 29 and thereafter the crest altering improved thread section 26 is rotated by 360° no more than approximately three turns, and perhaps fewer turns, so that no more than a first three threads of the improved thread section 26 are used to create the improved first and second start threads having the substantially flat crests without the fishmouths.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method for manufacturing a threaded bolt hole in a part, said bolt hole extending inwardly from a surface of the part, comprising the steps of:
    providing an unthreaded hole in the part;
    providing a tap for threading the unthreaded hole, said tap comprising
        a shank having at one end a tap drive section and at an opposite end a first thread section having a plurality of threads, said plurality of threads having a same major diameter at crests of the threads and a same minor diameter at valleys between the threads, and
        between said first thread section and said drive section a second thread section having a plurality of threads of a same pitch as a pitch of the plurality of threads of the first thread section for creating at least one improved start thread in the hole to be threaded, minor diameters at valleys between the threads of the second thread section being greater than minor diameters at the valleys between the threads of the first thread section;
    driving the tap such that the first thread section creates a plurality of threads in the hole having crests with a fishmouth shape at the crests defined by a central concave portion and raised corner portions at ends of the concave portion; and
    continuing to drive the tap such that said second thread section creates at least one start thread preceding threads with the fishmouth shaped crests and which has a substantially flat crest without the fishmouth shape.

2. The method of claim 1 including stopping the rotation of the tap after no more than three 360° rotations so that no more than three lead threads of the second thread section are employed for creating no more than two start threads not having said fishmouth shapes at their respective crests.

3. A method for manufacturing a threaded bolt hole in a part, said bolt hole extending inwardly from a surface of the part, comprising the steps of:
    providing an unthreaded hole in the part;
    providing a tap for threading the unthreaded hole, said tap comprising
        a shank having at one end a tap drive section and at an opposite end a first thread section having a plurality of threads, said plurality of threads having a same major diameter at crests of the threads and a same minor diameter at valleys between the threads, and
        between said first thread section and said drive section a second thread section having a plurality of threads of a same pitch as a pitch of the plurality of threads of the first thread section for creating at least one improved start thread in the hole to be threaded, major diameters at crests of the threads of the second thread section being greater than major diameters at the crests of the first thread section;
    driving the tap such that the first thread section creates a plurality of threads in the hole having crests with a fishmouth shape at the crests defined by a central concave portion and raised corner portions at ends of the concave portion; and
    continuing to drive the tap such that said second thread section creates at least one start thread preceding threads with the fishmouth shaped crests and which has a substantially flat crest without the fishmouth shape.

4. The method of claim 3 including stopping the rotation of the tap after no more than three 360° rotations so that no more than three lead threads of the second thread section are employed for creating no more than two start threads not having said fishmouth shapes at their respective crests.

* * * * *